Jan. 5, 1926.
B. J. LOAGUE
1,568,229
WINDSHIELD CLEANER AND HEATER
Filed March 2, 1925
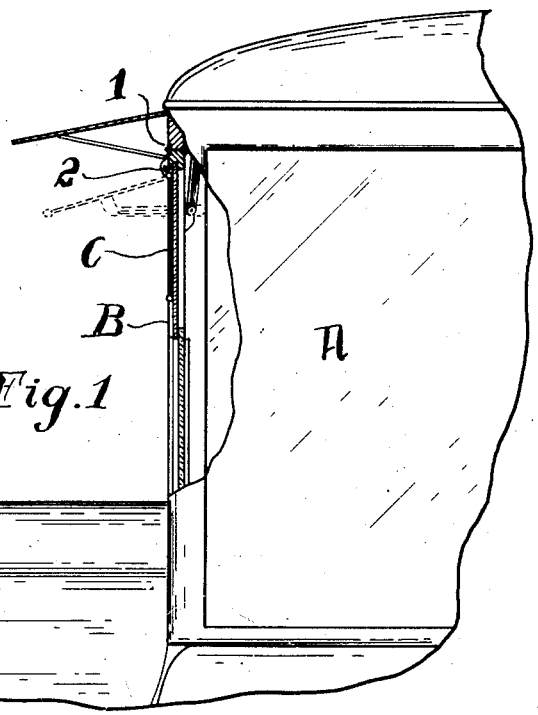
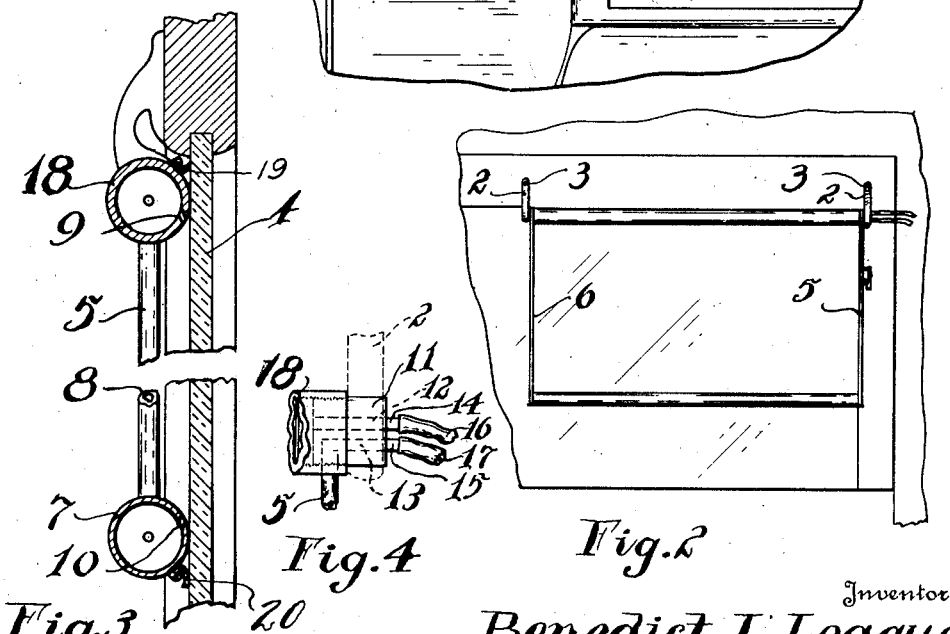
Inventor
Benedict J. Loague
By A. P. Johnson
Attorney Patented Jan. 5, 1926.

1,568,229

UNITED STATES PATENT OFFICE.

BENEDICT J. LOAGUE, OF ST. PAUL, MINNESOTA.

WINDSHIELD CLEANER AND HEATER.

Application filed March 2, 1925. Serial No. 12,682.

*To all whom it may concern:*

Be it known that I, BENEDICT J. LOAGUE, a citizen of the United States, residing at St. Paul, in the county of Ramsey and State of Minnesota, have invented certain new and useful Improvements in Windshield Cleaners and Heaters, of which the following is a specification.

The present invention relates to a windshield cleaner and heater for automobiles.

In driving an automobile in inclement weather, the windshield thereof may become so covered with rain or snow as to obstruct the vision of the driver of the automobile to a dangerous degree.

An object of the present invention is to affix a device to the windshield of an automobile to direct a downward current of heated air across the surface of the windshield to prevent an accumulation of rain or snow on the windshield to obstruct vision therethrough.

Another object is to affix a pair of slotted tubes adjacent the windshield of an automobile in laterally spaced relation from each other to cause a flow of air across said windshield intermediate the tubes to clean the windshield.

These and other objects of the invention, not specifically mentioned, will be more fully brought out in the following description and the accompanying drawings, wherein:

Figure 1 is a view in side elevation of an automobile equipped with a windshield cleaner made in accordance with the present invention, a portion of the automobile being broken away to more clearly show the method of attaching the cleaner.

Figure 2 is a view in front elevation of a portion of a windshield with a windshield cleaner made in accordance with the present invention connected thereto.

Figure 3 is an enlarged fragmentary section through a windshield and cleaner, showing a method of connecting the cleaner in position and the structure of the cleaner; and Figure 4 is a view in elevation of a pivotal connection by means of which the cleaner is suspended from the windshield frame.

Referring to the drawings in detail, an automobile A is provided with a windshield of a well known type, the upper half B thereof being connected to the upper part of the automobile body by a hinge 1. A pair of goose-neck brackets 2 are connected to the upper portion of the windshield as by screws 3. Intermediate the brackets 2, a frame C is pivotally mounted so that an upper tubular member 18 thereof is laterally closely adjacent the glass 4 of the windshield. Spacing members 5 and 6 integrally connected to upper member 18 have integrally connected thereto at their lower ends a second tubular member 7. Spacing member 6 may be a solid rod, but spacing member 5 is tubular, the central opening 8 of which is in open communication with the interior of lower tubular member 7. Slots 9 and 10 are provided in the tubular members 18 and 7, respectively, extending the entire length of said members. The slot 9 in the upper tubular member is positioned to direct a stream of heated air downwardly across the surface of the windshield when said heated air is introduced under pressure into the interior of the member, while the slot 10 in the lower tubular member is positioned as shown to draw air from the face of the windshield downwardly and into member 7 when air is evacuated from within member 7.

In Figure 4 is shown a structure by which air may be introduced under pressure into the upper member 18 and may be simultaneously evacuated from within lower member 7. In this structure, a plug 11 may be threadedly inserted into the end of upper member 18, the plug 11 being provided with passages 12 and 13 therein. The passage 12 extends entirely through the plug so as to be in open communication with the interior of member 18. The second passage 13 extends inward and then downward and out the side of plug 11 and is in open communication with tubular member 5 which is threaded into member 18. The lower end of tubular member 5 is in open communication with the interior portion of lower member 7.

A pair of drilled plugs 14 and 15 may be threadedly inserted into the end of passages 12 and 13, and tubes 16 and 17 may be connected to the drilled plugs 14 and 15. Tube 16 may be connected to a hermetically sealed chamber, commonly known as a hot stove, attached to a side of the exhaust line of an automobile engine, and into this stove a supply of air may be forced by a blower of a well known type, not shown. The heated air is forced from the stove, through the tube 16, into the member 18, whence it is discharged downwardly across the face of the windshield through slot 9.

The second tube 17 may be connected to an evacuating device which may be in the exhaust line of the automobile engine at a point near the rear end of the muffler, where a partial vacuum is created by the exhaust gases passing therethrough. The evacuating action will be transmitted to the interior of lower member 7 through the tube 17 which will tend to draw air downwardly across the face of the windshield, and into lower member 7.

The combined actions of the heated air projected through the opening 9 across the face of the windshield in a downward direction, and the suction through the opening 10 in lower member 7, tend to keep a continuous current of air passing down across the face of the windshield to heat it and to keep it clear of accumulations of dust, rain, snow, sleet, and frost. Rubber strips 19 and 20 are affixed to member 18 and 7, respectively, to make a substantially air tight seat between the members 18 and 7 and the glass of the windshield.

The blast discharged through the opening 9 in member 18, being in a heated condition, acts to heat the windshield and thereby prevent an accumulation of frost or moisture on the surface of the windshield. This is of marked value in closed cars during cold weather, when the interior surfaces of the glass closures thereof frequently become frosted by the breath of persons within the car. Heating the windshield glass prevents the formation thereon of such frost accumulation by raising the temperature of the glass above the frost point, thereby greatly facilitating winter driving in a closed car.

What I claim is:

1. In a device of the character described, a frame pivotally connected to a windshield, comprising a pair of slotted tubular members, means to hold the tubular members in laterally spaced relation from each other with the slots therein directed toward each other and angularly toward the windshield, pressure means in open communication with the interior of one of said hollow members to discharge a blast of heated air into said hollow member and outwardly through the slot therein, and evacuating means in open communication with the other of said hollow members to draw air through the slot in said hollow member from the face of the windshield into said hollow member.

2. In a device of the character described, a skeleton frame work having a pair of tubes mounted on opposite sides thereof, each of said tubes having a slot therein directed angularly toward the other of said tubes and toward the windshield, means to pivotally mount the skeleton frame work adjacent a windshield, and means to connect one of said tubes to an exhaust manifold of a motor to transmit heated air under pressure into said tubular member and through the slot therein across the face of the windshield, the second tubular member having means connecting it to an evacuating means to evacuate air from within said second tubular member to draw air into the slot therein, for the purpose set forth.

In testimony whereof I affix my signature.

BENEDICT J. LOAGUE.